US005352864A

United States Patent [19]

Schultheis et al.

[11] Patent Number: 5,352,864

[45] Date of Patent: * Oct. 4, 1994

[54] PROCESS AND DEVICE FOR OUTPUT CONTROL AND LIMITATION IN A HEATING SURFACE MADE FROM GLASS CERAMIC OR A COMPARABLE MATERIAL

[75] Inventors: Bernd Schultheis, Schwabenheim; Klaus Kristen, Wiesbaden; Martin Taplan, Ingelheim; Herwig Scheidler, Mainz, all of Fed. Rep. of Germany

[73] Assignee: Schott Glaswerke, Mainz, Fed. Rep. of Germany

[ * ] Notice: The portion of the term of this patent subsequent to Jul. 13, 2010 has been disclaimed.

[21] Appl. No.: 731,775

[22] Filed: Jul. 18, 1991

[30] Foreign Application Priority Data

Jul. 18, 1990 [DE] Fed. Rep. of Germany ....... 4022846

[51] Int. Cl.[5] .......................... H05B 1/02; H05B 3/74; G05D 23/20

[52] U.S. Cl. .................................... 219/449; 219/464; 219/445

[58] Field of Search ............... 219/448, 449, 450, 453, 219/506, 445, 446, 464, 465; 374/137, 166

[56] References Cited

U.S. PATENT DOCUMENTS

| | | | |
|---|---|---|---|
| 3,622,754 | 11/1971 | Hurko | 219/464 |
| 3,786,390 | 1/1974 | Kristen | 338/22 R |
| 4,237,368 | 12/1980 | Welch . | |
| 4,350,875 | 9/1982 | McWilliams | 219/449 |
| 4,394,564 | 7/1983 | Dills | 219/449 |
| 4,639,579 | 1/1987 | Brooks | 219/464 |
| 4,740,664 | 4/1988 | Payne | 219/449 |
| 4,755,655 | 7/1988 | Reiche et al. | 219/449 |
| 5,001,423 | 3/1991 | Abrami | 219/464 |
| 5,227,610 | 7/1993 | Schultheis et al. | 219/449 |
| 5,258,736 | 11/1993 | Kristen et al. | 219/449 |
| 5,270,519 | 12/1993 | Higgins | 219/464 |

FOREIGN PATENT DOCUMENTS

| | | |
|---|---|---|
| 0138314 | 4/1985 | European Pat. Off. . |
| 2139828 | 2/1973 | Fed. Rep. of Germany . |
| 3100938A1 | 12/1981 | Fed. Rep. of Germany . |
| 3117205A1 | 12/1982 | Fed. Rep. of Germany . |
| 3744372A1 | 7/1988 | Fed. Rep. of Germany . |
| 3736005A1 | 5/1989 | Fed. Rep. of Germany . |
| 8914470.8 | 12/1990 | Fed. Rep. of Germany . |
| 2515790 | 5/1983 | France . |
| 2060329 | 4/1981 | United Kingdom . |
| 2138659 | 10/1984 | United Kingdom . |

*Primary Examiner*—Bruce A. Reynolds
*Assistant Examiner*—John A. Jeffery
*Attorney, Agent, or Firm*—Millen, White, Zelano & Branigan

[57] ABSTRACT

A process is provided for output control and limitation in a heating surface made from glass ceramic or a comparable material, especially a glass ceramic cooking surface. In a heating surface, in which the individual heating zones are each heated with several heating elements, switchable and controllable independent of one another, it is provided according to the invention that all points of the areas essential for a stress case, especially local overheating, are detected by several temperature sensors, independent of one another, which are placed in the area of the heating zone, to switch and to control the individual heating elements, independent of one another so that the output distribution in the heating zone area is largely matched to the locally varying removal of heat.

18 Claims, 6 Drawing Sheets

PROCESS AND DEVICE FOR OUTPUT CONTROL AND LIMITATION IN A HEATING SURFACE MADE FROM GLASS CERAMIC OR A COMPARABLE MATERIAL

BACKGROUND OF THE INVENTION

The invention relates to a process for output control and limitation in a heating surface made from glass ceramic or a comparable material, especially a glass ceramic cooking surface, in which the individual heating zones of the heating surface are heated in a way known in the art with heating devices with several heating elements which are switchable and controllable independently of one another. The invention also relates to a preferred device for performing the process in a cooking area with a glass ceramic cooking surface.

Heating surfaces made from glass ceramic or a comparable material are also used, for example, as wall or ceiling radiators, heat exchangers, or other large-surface heating devices, which can be heated in any way.

Electrically or gas-heated cooking areas or individual burners, whose heating surface consists of glass ceramic, are now of special interest. Cooking areas of this type are generally known and have already been described many times in the patent literature. Heating of the heating zones of these cooking areas (without narrowing the concept, the heating zones in the cooking areas below are also named cooking zones) takes place by heating devices, e.g, electrically operated contact heating elements, radiant heating elements or gas burners, placed below the glass ceramic cooking surface. Further, induction cooking areas are also known.

In the known household cooking areas, the heat output for the heating devices is permanently adjusted by the presetting of the user or electronically, electromechanically or, with gas stoves by valves, purely mechanically controlled by a selectable time program. Corresponding controls are described, for example, in patent specification DE-PS 3 639 186 A1.

It is known to heat heating zones of a glass ceramic cooking area, which exhibit a sizable diameter, for example, to heat pots with sizable diameter and/or non-round, for example, oval, bottom surfaces with heating elements with several heating circuits. It is also known to use, besides the permanent heating elements constantly in operation, so-called auxiliary heating elements, which are actuated only in the boiling phase, to achieve an accelerated heating-up of the cooking zone. In this case, the geometric arrangement of the heating elements or heating circuits below a heating zone then is usually matched to the geometry of the cookware.

Thus, for example, a hot plate with two heating circuits, concentric to one another, is described in DE-OS 33 14 501 A1, in which the outside heating circuit is designed as an auxiliary heating circuit.

DE-PS 34 06 604 relates to a heating device, in which the heating zone is heated by several high-temperature and normal-temperature radiant heating elements. The heating elements in this case are placed so that the heating point is divided into two zones, concentric to one another, and the inside zone can be heated only by the high-temperature radiant heating elements usable preferably as auxiliary heating elements in the boiling phase and the outside zone by the normal-temperature radiant heating elements. A comparable arrangement of several radiant heating elements in the area of a cooking zone is also to be found in U.S. Pat. No. 4,639,579.

A heating device with a gas burner, which exhibits two burner chambers, independent of one another and able to be actuated with gas, which, e.g., can delimit zones, concentric to one another, in the cooking zone area, is described in U.S. Pat. No. 4,083,355.

In the glass ceramics usually used, the maximum operating temperatures are to be limited to 700° C. To avoid overheating the glass ceramic heating surface, therefore as a rule so-called protective temperature limitation devices, e.g., a bar expansion switch placed mostly along a diameter between the heating elements and the glass ceramic surface, are used, which usually turn off the heating device completely or reduce its output when a specific temperature limit is exceeded. After passing through a hysteresis, the full heat output is again turned on. A bar expansion switch, for example, with two different switch points, which operates accordingly at two different temperatures, is known from DE-OS 3 314 501.

From German patent specification DE-PS 21 39 828, it is known that glass, glass ceramic or similar materials have an electrical resistance dependent on the temperature, so that temperature-measuring resistances with steep resistance-temperature characteristics, similar to the known NTC resistances, can be produced from them by applying strip conductors, e.g., made from noble metals.

This type of temperature sensors is used in DE-OS 37 44 372, in connection with the corresponding wiring, to replace the above-mentioned protective temperature limitation device completely. For this purpose, in each cooking zone in each case, two strip conductors, parallel to one another, which each delimit a strip-like glass ceramic resistance, are applied along a half diameter on the glass ceramic cooking surface.

Experience has shown that anomalous thermal stress conditions in glass ceramic cooking surfaces result mostly from using inferior cookware or operating errors.

Thus, e.g., in cookware with uneven support surfaces, a locally varying removal of heat takes place in the cooking zone. By carelessness, empty cookware can cause still higher temperature/time stresses for the glass ceramic. Pots with too small diameters as well as those inadvertently placed, i.e., pots which are not centered, cause additional extreme stresses. In these cases, the cooking zone in the areas not covered by the pot is overheated. The surface temperature of the glass ceramic can in such cases be considerably above the temperatures measured in the potless operation. Temperature increases of up to 200 K above the surface temperature in the potless operation are possible.

These anomalous thermal stresses in the area of the cooking zones can add up to high temperature/time stresses over time and can bring about the destruction of the cooking surfaces. Extremely high temperatures can damage the surface-mounted cookware and also the glass ceramic cooking surface. Pot enamel can, for example, melt in the case of steel enamel cookware which is inadvertently placed empty on a glass ceramic cooking surface. Also, aluminum cookware left on the cooking surface while empty can damage the glass ceramic surface by melting aluminum.

Since, in practice, both inferior or unsuitable cookware is used and the above-mentioned operating errors occur, the maximum surface temperature in the potless operation has to be limited. For the same reason, the specific output density of the heating devices, relative to the surface of the heated zone, is now limited to about 7 watt/cm$^2$.

The above-described anomalous stress conditions, on the one hand, can lead to damage of the glass ceramic cooking surface and, on the other hand, considerably worsen the efficiency of the cooking system.

It is known that with inferior cookware, the average output offered by the heating device can be increased if the potless operation adjustment of the heating device is increased. This generally leads to a shortening of the boiling time. But with the constant use of this 10 cookware, exceeding the stress limits of temperature/time and thus the possible destruction of the glass ceramic cooking surface, cannot be eliminated by the increase of the potless operation adjustment.

With the use of good cookware, no increase of the average output can be achieved with this method, and connected with it, the boiling time be lowered. Good cookware withdraws so much heat from the glass ceramic that the protective temperature limitation device responds rarely or not at all during the boiling processes. The full nominal output of the heating device is generally always available in boiling processes in connection with good cookware. The efficiency can be increased here only by raising the heat output and by simultaneously raising the potless operation adjustment of the protective temperature limitation device with the drawbacks already described.

SUMMARY OF THE INVENTION

The object of the invention is to provide an improved process for output control and limitation in a heating surface made from glass ceramic or a comparable material, especially in a glass ceramic cooking surface, which makes it possible to use the cooking system optimally, even using inferior cookware, but in doing so to keep the thermal stress of the heating surface low.

Another object of the invention consists in providing a suitable device to perform the process in a cooking area with a glass ceramic cooking surface.

Upon further study of the specification and appended claims, further objects and advantages of this invention will become apparent to those skilled in the art.

The objects of the instant invention are achieved in accordance with a process and arrangement for controlling the temperature of a glass ceramic plate having a heating surface wherein the arrangement includes an array of separately controlled heating elements proximate the plate and an array of separately monitored temperature sensors mounted on the plate in proximity with at least some of the heating elements. The process and arrangement provide for controlling the individual heating elements with the proximate temperature sensors to energize the individual heating elements upon detecting localized removal of heat from the heating surface.

According to the invention, it is provided to detect the temperature distribution in the heating zone, especially local overheatings, with several temperature sensors, independent of one another, placed in the area of a heating zone, which, for example, in a cooking area, can be integrated in the cooking zone surface, and to switch and to control, independent of one another, the heating elements or the heating circuits, assigned to the heating zone, with the temperature signals obtained from them so that the output distribution and thus the surface stress of the heating zone is matched to the locally varying heat flow, which is dependent, for example, in cooking areas, on the geometry of the support surface of the superposed pots.

The heating takes place at the points of the greatest removal of energy, thus, e.g., also with inferior pot quality with optimal heat output, while overheatings are avoided at the points with low removal of heat by reduction, e.g, timing of the heat output.

The conversion of the temperature-measuring signals to control signals for the output supply of the heating elements takes place with control and adjusting devices known in the art.

In the simplest case, when a specified threshold temperature is exceeded, the power supply for the heating elements is interrupted until the temperature in the assigned overheated cooking zone area is again below the threshold temperature. Then, the full heat output is again switched on.

But then shorter cooking times are achieved in cooking areas, if the power supply for the heating elements in time intervals is reduced continuously or in stages, for example, to a level each reduced by at least 10%, until the heat output of the heating elements is matched optimally to the maximum possible removal of heat in the assigned area of the heating zone.

The reduction of output in stages at various switching temperatures can take place in a way known in the art so that for each switching temperature, a separate temperature sensor is present in the area of the heating zone assigned to the respective heating element. But it is advantageous, for this purpose, to use only a single temperature sensor, to which a switching and control element is downstream, which switches back in succession at various temperatures to various output levels.

Temperature sensors, independent of one another, in the meaning of this invention, for example, can be electromechanically operating temperature sensors with several switching contacts, independent of one another, such as, for example, the known bar expansion switches, for example, in the form of capillaries with a molten salt filling, with several, but at least two, switching contacts, independent of one another. Thus, the switching contact, which limits the maximum surface temperature, should advantageously respond at a temperature which is at least 10 K above the switching temperatures of the other switching contacts, with whose help the output reduction is performed.

As temperature sensors, heat-conducting rods or sheets or the like, to which the actual temperature sensor is coupled outside the heating element or the heated zone, can also be used.

In cooking areas with cooking zones with basically circular geometries, most of the known anomalous stress cases, namely those which lead to a radially symmetric temperature distribution in the cooking zone area, can be detected completely with bar expansion switches, which are placed along a half-diameter or diameter of the cooking zone. But locally occurring temperature peaks cannot be detected in this way. Moreover, the temperature monitoring is only indirectly possible since the bar expansion switch has no direct contact to the glass ceramic underside, since it is placed only in the space between the heat source and the glass ceramic underside.

A surface-covering temperature monitoring, for example, can be achieved with temperature sensors, which consist of grid-like thermoelements placed in the area of the heating zone or other suitable temperature sensors. To assure a sufficient thermal contact on the heating surface, the temperature sensors have to be pressed on the heating surface. Also, such temperature sensors can be integrated in the heating surface. Thus, for example, thermoelements can be embedded or rolled in the heating surface.

Preferably, the temperature sensors integrated in the heating surfaces, known from DE-PS 21 39 828, are used. For this purpose, two parallel strip conductors are applied, for example, by silk-screen printing, cathode sputtering or other methods, and then burned in on the heating surface in the area of the heating zones in a way known in the art. The electrical resistance, greatly dependent on temperature, of the glass ceramic enclosed between the strip conductors, represents the actual temperature sensor.

With this method, large-surface temperature sensors of any shape, which allow a surface-covering temperature monitoring, can be produced in a simple way. Thus, for example, large-surface radiators and heat exchangers with hot surfaces made from glass ceramic, glass or similar materials also can be monitored and controlled.

The geometric arrangement of the strip conductors in the area of a heating zone is suitably matched to the geometric arrangement of the heating elements as well as to the expected temperature distribution in known anomalous thermal stress cases.

The temperature sensors advantageously detect all essential parts of the heated area of the heating zone assigned to the heating elements, so that local overheating is also detected. For example, points of high temperatures adjacent to these points can occur above heating coil loops or in the area of flame peaks, e.g., with gas heating. These temperature peaks have to be detected, since otherwise the heating surface can be damaged at these points.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
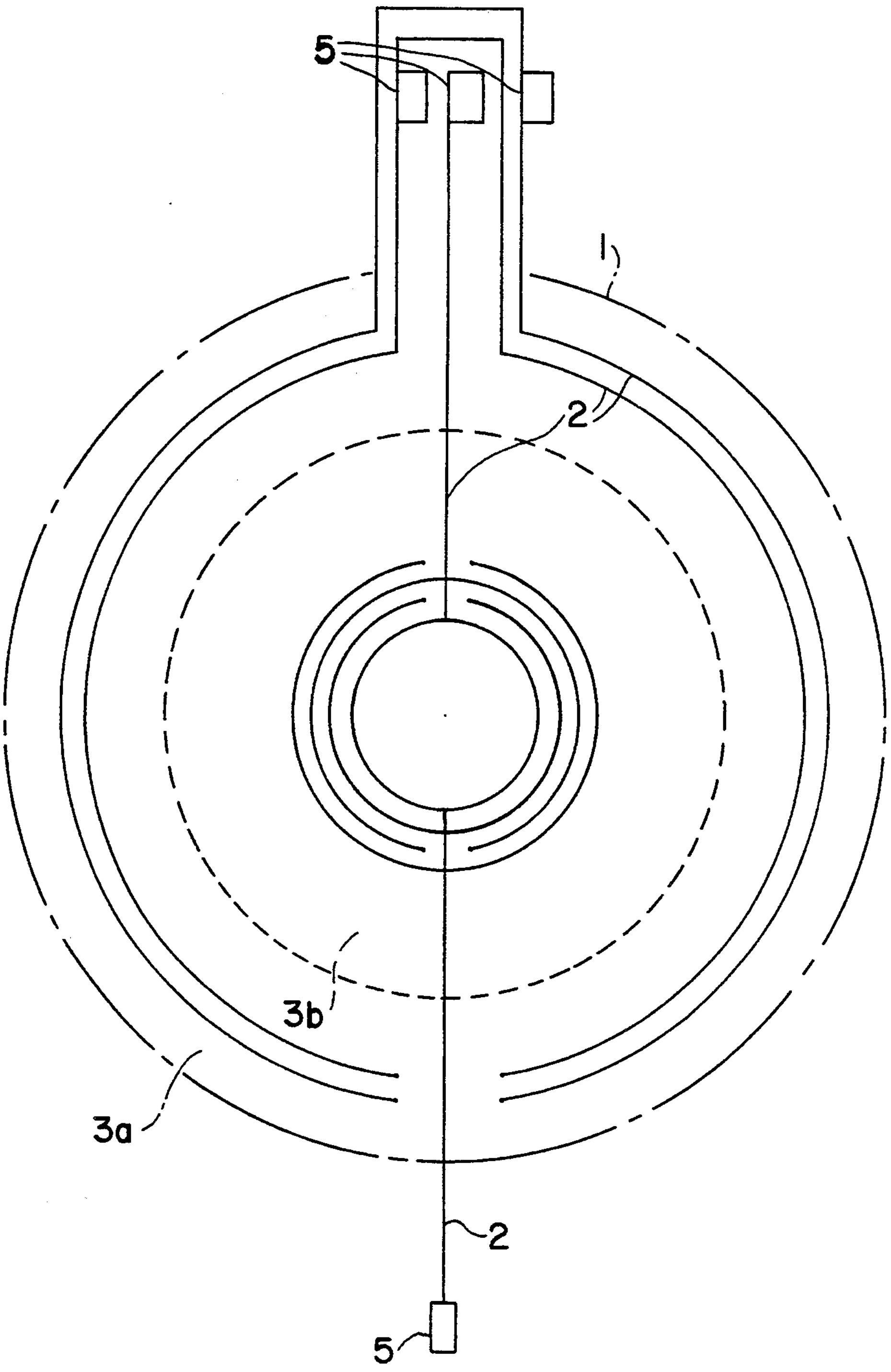
FIG. 1 is in a diagrammatic representation, a device to perform the process according to the invention in a household cooking area with a glass ceramic cooking surface, in which two circular temperature sensors placed concentrically to one another, according to the arrangement of the heating circuits of a dual-circuit heating element, monitor the central area and the edge area of a cooking zone.
Figure 2:
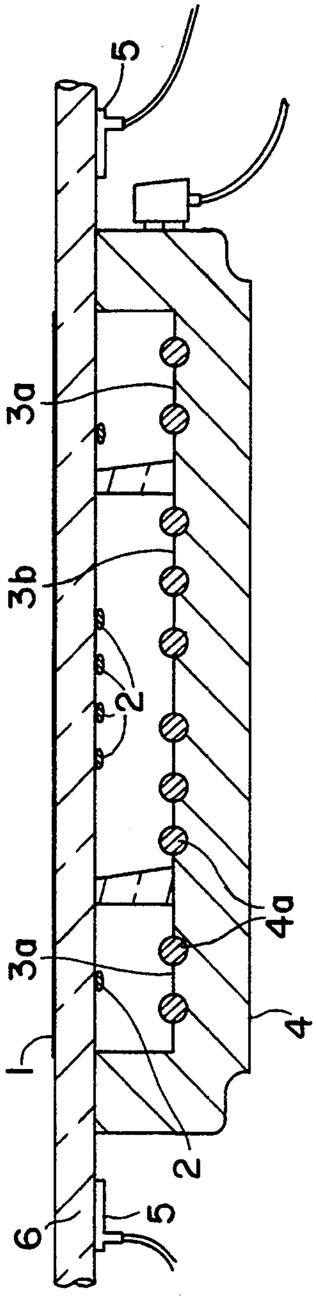
FIG. 2 is the device of FIG. 1 in a longitudinal section representation.

FIGS. 1 and 2 show, by way of example, a device which is especially suitable for performing the process according to the invention in a cooking area with a glass ceramic cooking surface.

In this arrangement, strip conductors (2) made from gold are placed inside cooking zone (1) of a glass ceramic cooking area on the glass ceramic underside. Running of the strip conductor is selected so that outside circuit **(3*a*) and inside circuit (3*b*) of a dual-circuit heating element (4) are each covered with strip conductors made in a circular manner. Connecting areas (5) are outside cooking zone (1)** for protection from thermal stresses.

FIG. 2 shows the arrangement consisting of glass ceramic plate (6), dual-circuit heating element (4) with heating coils **(4*a*) and strip conductors (2), printed on the underside of the glass ceramic, as well as connecting areas (5)** in section.

The invention is by no means limited to the use of the dual-circuit heating elements represented in FIGS. 1 and 2. On principle, each heating device that consists of several switchable and controllable heating elements, independent of one another, in the area of a cooking zone can be used. The invention can also be used, e.g., with gas burners, thus, e.g., also with gas burners known from U.S. Pat. No. 4,083,355 with two burner chambers, independent of one another, able to be fed with fuel.

The heating elements can, e.g., be placed in a grid below the cooking zone. But the geometric arrangement of the heating elements is advantageously matched to the geometry of the cookware or to the temperature distribution in the cooking zone area in known anomalous thermal stress cases, so that an effective control of the output distribution in the locally varying removal of heat is possible.

With possible operating errors and/or deficiencies of the cookware in cooking areas with a glass ceramic cooking surface, i.e., a varying removal heat in the edge area and central area of the cooking zone occurs. The use of multicircuit heating elements (with and without insulation barriers between the heating circuits)—especially dual-circuit heating elements with two heating circuits concentric to one another—which allow a separate heating of the edge area and central area, is therefore especially advantageous for the use of the process according to the invention. In this case, it can be suitable, depending on the application, to design the individual heating circuits for various surface stresses. With a circular arrangement of the strip conductors above the heating circuits, not only is an effective monitoring of the areas of the cooking zone assigned to the individual heating circuits possible but also all points, relevant for a stress case, in the area of the cooking zone are detected.

Strip conductors (2) cover only a small part of the cooking zone. Strip conductor widths of less than 3 mm are preferred. In this case, the strip conductors are 12 mm wide, so that the total surface of the strip conductors relative to the surface of the heated zone is small. An influencing of the total heat flow is minimized in this way. The surface resistance of these strip conductor layers is less than or equal to 50 m Ω/□ with layer thicknesses under 1 micron.

Figure 3B:
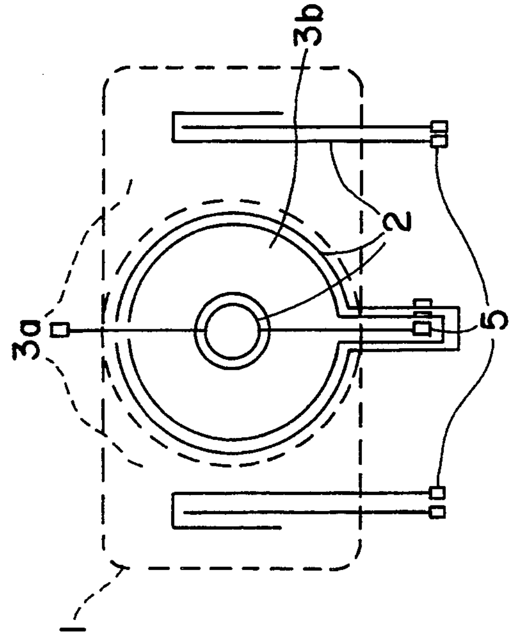
FIGS. 3*a* and 3*b* is a sensor arrangement for non-round multicircuit heating elements.
Figure 3A:
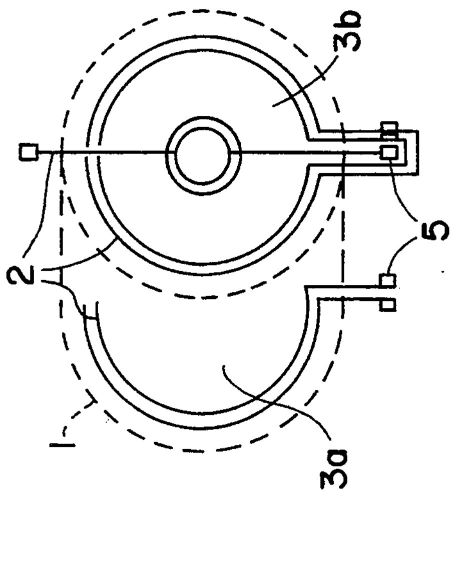

Two temperature sensors, independent of one another, which separately monitor both heating circuits (3*a* and 3*b*), are thus obtained. Analogously to the above-described arrangement, the strip conductor arrangements matched to the respective contours or geometries are selected for other, nonround heating elements, with which the individual cooking zone areas are monitored separately. FIGS. 3*a* and 3*b* show corresponding arrangements for square and oval multicircuit heating elements.

Strip conductors (2) run parallel inside cooking zone (1) delimit narrow circular or linear temperature-measuring zones, in which the glass ceramic volume enclosed by the strip conductors is used as temperature-dependent resistance. The electrical conduction of the glass ceramic, as in the case of glasses, is based on the ionic conduction. The dependence is described by the law of Rasch and Hinrichsen:

$$R=a * exp\,(b/T) \qquad \text{(eq. 1)}$$

R is the specific resistance of the glass ceramic in ohm*cm at absolute temperature T in kelvins.

a and b are constants dependent on the geometry of the strip conductors and on the glass ceramic (a in ohm*cm and b in K). The temperature coefficient of these measuring resistances is negative. It is very dependent on temperature and is 3.3%/° C., e.g., for glass ceramics of the $SiO_2$-$Al_2O_3$-$Li_2O$ system at 300° C.

The overall electrical resistance of such an arrangement consists of any number of differential resistances, connected in parallel, with negative temperature coefficients, and can be expressed by the following equation:

$$1/R=1/R_1\,(T)+1/R_2\,(T)+\ldots+1/R_i\,(T)+\ldots 1/R_n\,(T) \qquad \text{(eq. 2)}$$

The temperature-dependent resistance of each differential resistance $R_i$ (T) can be expressed by the following equation:

$$R_i\,(T_i)=I_i/A_i * a * exp\,(b/T_i) \qquad \text{(eq. 3)}$$

in which $I_i$ represents the length in cm and $A_i$ represents the cross section surface in $cm^z$ of each differential glass ceramic resistance. Constants a and b are constants dependent on the geometry of the strip conductors and on the glass ceramic (a in ohm*cm and b in kelvins). $T_i$ is the absolute temperature of each differential resistance in kelvins.

The overall electrical resistance is determined by the lowest resistance at the point of the highest temperature of the sensor zones, from which an automatic indication of the maximum temperature results in the respective sensor zone. High temperatures occurring locally cause one or more differential resistances to become low-ohmic, relative to the other differential resistances, which are in colder zones, so that the overall resistance of a sensor according to eq. 2 becomes very low.

Figure 4:
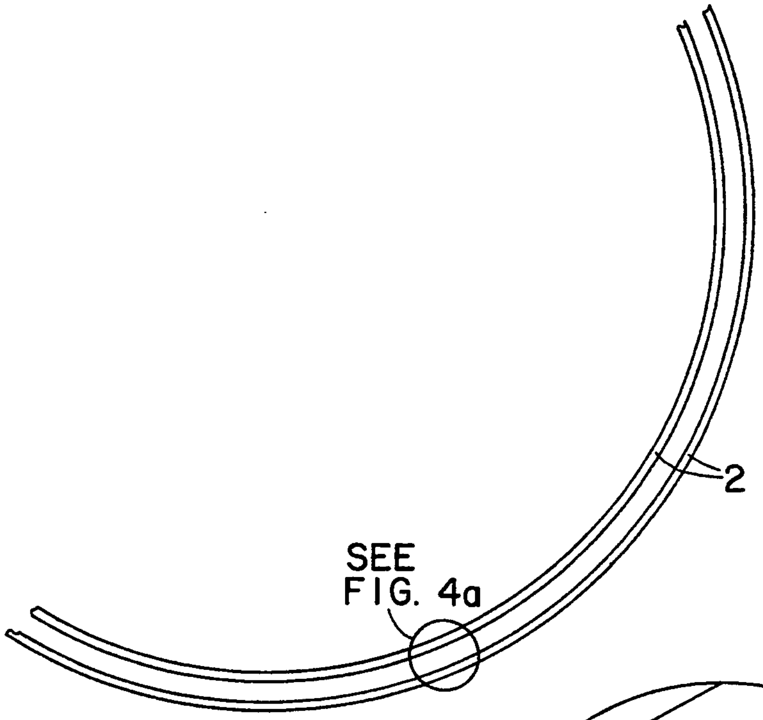
FIG. 4 is for illustration of the mode of operation of a glass ceramic temperature-measuring resistance in a diagrammatic representation, an enlarged cutout from an arrangement of two strip conductors running parallel with an intervening glass ceramic resistance.
Figure 4A:
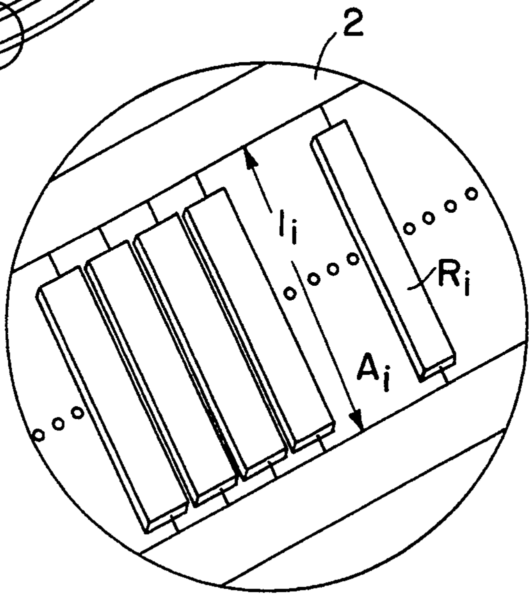

For illustration, FIG. 4 diagrammatically shows a cutout of opposite strip conductors (2). The glass ceramic enclosed between them can be viewed as a parallel circuit of many temperature-dependent, differential resistances.

At low temperatures, this arrangement according to eqs. 2 and 3 has a very high resistance. At higher temperatures, for example, the typical temperatures which are measured in the potless operation, the resistance decreases several orders of magnitude. Also, the resistance decreases considerably if high temperatures occur only in a small area of the glass ceramic, e.g., with improperly shifted pot. A temperature equalization between adjacent zones, which have varying temperatures, hardly occurs because of the low heat conduction in glass, glass ceramic or similar material with a of typically less than 2 W/mK.

The reaction of the temperature-dependent conductivity change of the glass ceramic in a measuring signal can be achieved in a voltage divider provided with ac voltage, in which a resistance is formed by the temperature-dependent resistance of the sensor surfaces. The fixed resistances of the voltage divider, dependent on the sensor geometry, have to be selected so that at temperatures which exceed the allowed temperature/time stress, signal changes, sufficient for further processing, can be taken off the voltage divider. The temperature range, in which the greatest signal deviation occurs, can be changed by matching the fixed resistances. The fixed resistances are simultaneously used for the current limitation.

The ac voltage is necessary to avoid polarization effects of the glass ceramic and the associated electrochemical decomposition because of the ionic migration. Frequencies which are in the range between 50 Hz and 1,000 Hz are preferred for the adjacent ac voltage.

Figure 5A:
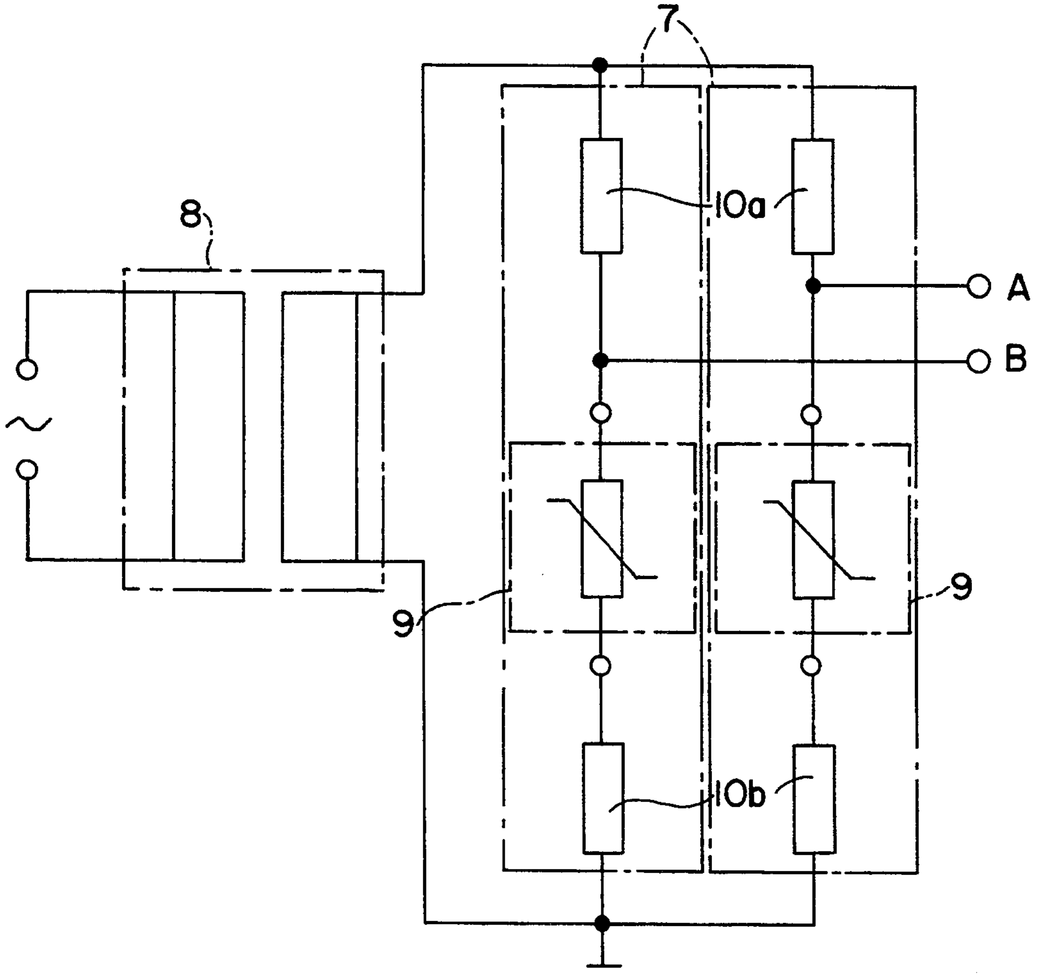
FIG. 5*a* is in a diagrammatic representation, a known switching arrangement for the sensor arrangement of FIG. 1 to adjust the temperature range with maximum measuring sensitivity.

FIG. 5*a* diagrammatically shows the circuit arrangement according to the invention, and a voltage divider (7) each is represented for each temperature sensor. Both voltage dividers are supplied by an ac voltage source (8), represented here as a transformer. Thus, it is guaranteed that direct current does not flow through the glass ceramic, represented here as a temperature-dependent resistance (9). Both fixed resistances (10*a*) and (10*b*) were selected so that a great signal change occurs in the range of 500 to 600° C. This temperature range is characteristic for the surface temperatures occurring in practice inside cooking zones (1) of glass ceramic cooking areas.

The ac voltage signal coming from the voltage divider is rectified by a rectifier circuit and feeds a suitable electronic circuit. These can be operational amplifiers, which are connected as comparators, or other circuits and components known from electronics, such as microprocessors or the like.

The signals delivered by the sensors are processed in these circuits so that on their output, a signal is available with which the individual heating circuits can be controlled by relays or output semiconductor components, such as triacs or MOSFETs. The output control, for example, can take place by phase lag, half- or full-wave packet control with various pulse-width repetition ratios so that also continuous temperature controls become possible. The output signal of the control electronics can in this case also be fed to the above-described semiconductor components by optocouplers or other circuits, which provide for the electrical separation between the control electronics and the output part. Also, so-called no-voltage switches can be made which switch the individual heating circuits of the heating elements only in the voltage zero passage.

Figure 5B:
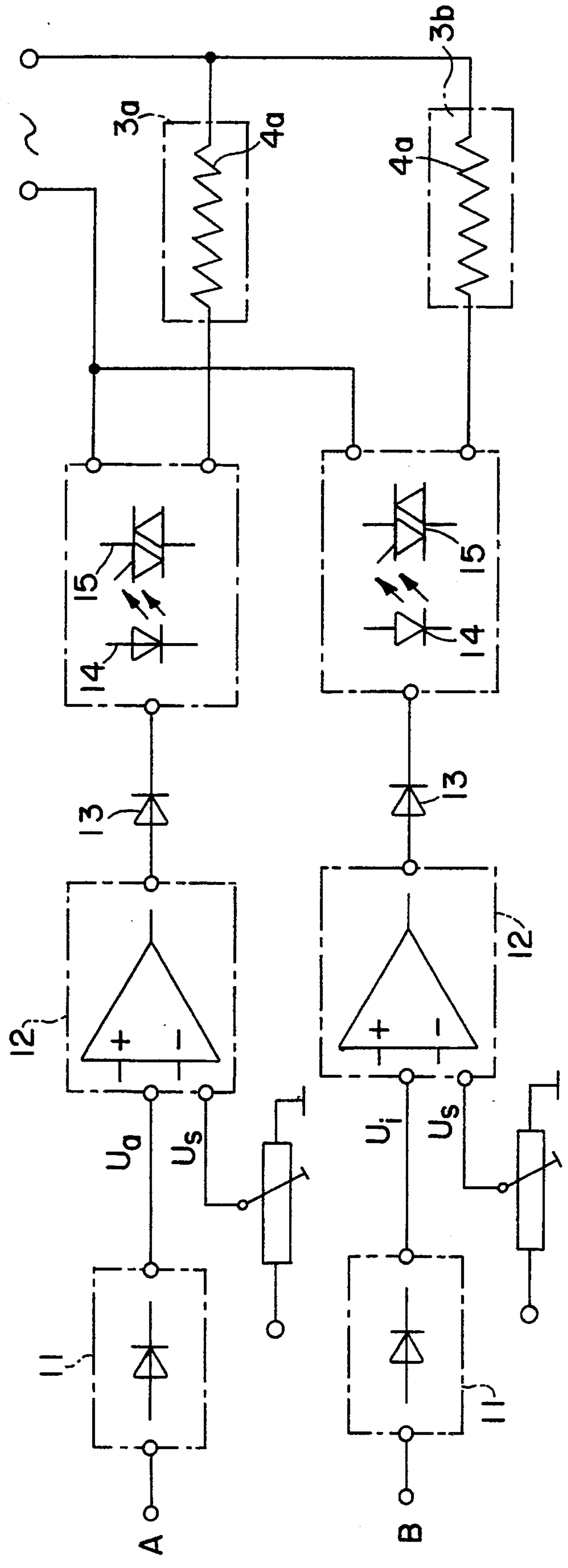
FIG. 5*b* is in a diagrammatic representation, a known switching arrangement for the sensor arrangement of FIG. 1 to convert the temperature-measuring signals to control signals for the power supply of the heating circuits.

In the existing arrangement (FIG. 5*b*), the signal taken off on voltage divider (7) is fed by a rectifier circuit (11) to an input of an operational amplifier (12) 10 connected as a comparator. The comparator has the task of comparing the temperature-dependent signal originating from the sensor arrangement with a permanently adjusted voltage value of threshold voltage Us in FIG. 5*b*. If the voltage from the sensor is above the threshold voltage, which would be the case in this arrangement at comparatively low temperatures, e.g., using good cookware, the output of the comparator is put through. This signal is fed by a diode (13) and an optocoupler (14) to a semiconductor ac switch (triac) with an integrated no-voltage switch (15), which controls heating coil (4*a*) of a heating circuit. It is especially important, in this case, that in this arrangement an electrical separation exist between electronic measurement circuit and an output part.

With falling short of the threshold voltage, the output of comparator (12) switches to negative potential with increasing temperature. Diode (13) blocks, so that triac (15) also blocks. The corresponding heating circuit is turned off. The temperature of the glass ceramic consequently decreases again, by which the electrical resistance of the sensors is again increased. As a result, the voltage on the output of in the voltage divider again increases. As soon as rectified voltage U or U, is again above threshold voltage Us, the output of comparator (12) again switches to positive potential, by which triac (15) in the zero passage triggers by the diode now again conducting and thus the corresponding heating coil is turned on. With this arrangement, a control is thus made possible separately for each heating circuit.

Figure 6:
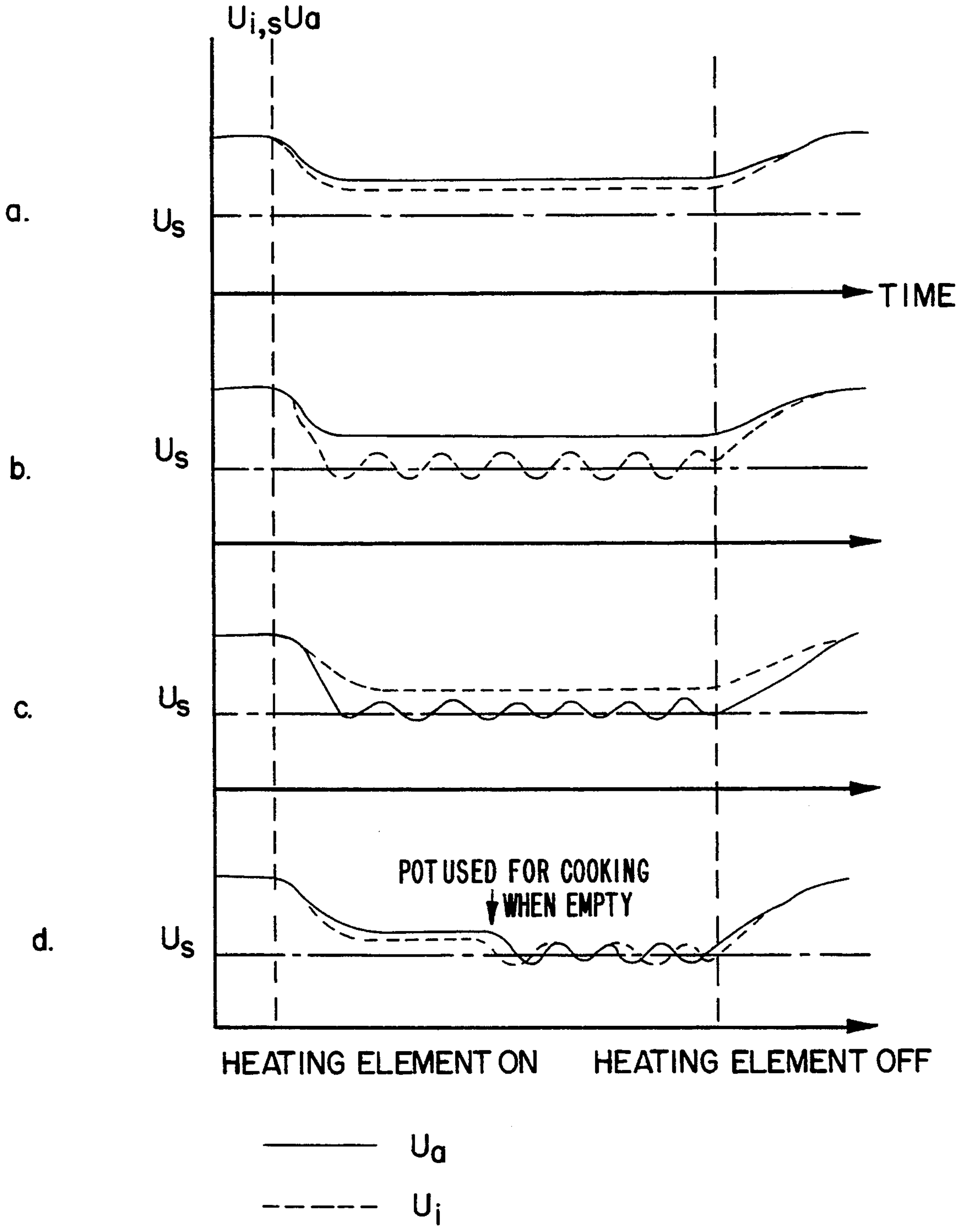
FIG. 6 is for a heating zone, heated with a dual-circuit heating element, for four different stress cases, the course of the sensor signals with time with an output control and limitation according to the invention.

In practice, this has the following effects:

By using good cookware, the surface temperature of the glass ceramic both in outside circuit (3*a*) and in inside circuit (3*b*) remains below a temperature corresponding to the threshold voltage. The outputs of both comparators have a positive potential, so that both heating circuits are turned on and thus can supply their full nominal output. FIG. 6*a* shows the time voltage shape for $U_i$ (inside circuit) and $U_a$ (outside circuit).

In cookware with a retracted bottom, the glass ceramic because of the inferior removal of heat heats up considerably more under the pot bottom in the area of the inside circuit then in the outside area of cooking zone (1), since in the outside area, the glass ceramic is in contact with the pot bottom. The result for the inside circuit is that the voltage is below the threshold voltage of the higher temperature. The output of the inside circuit is therefore reduced in the time average so that exceeding the temperature/time stress limit is impossible for the glass ceramic. FIG. 6*b* shows the typical course for $U_i$ and $U_a$. The timing in reaching threshold voltage $U_s$ can clearly be seen for the inside circuit. The hysteresis can be adjusted by suitable wiring of comparator (12). In the case of a pot with an outward arched bottom, the conditions are similar, the output for the inside but not for the outside heating circuit is reduced only corresponding to the position of the overheated zone in the outside area of the cooking zone.

In the likewise possible stress cases of "misplaced pot"or "too small a pot,"the outside area of the cooking zone is heated more than the inside area, so that the average output in the outside heating circuit is reduced accordingly, FIG. 6*c*.

For the case that an empty pot is placed on the cooking zone, the temperature of the glass ceramic increases greatly in the inside and outside area. In this case, the output in both heating circuits is reduced, FIG. 6*d*.

With the above-described arrangement, it is achieved that the output fed to the pot is optimally matched to its quality. The full nominal output is made available to pots with good quality because of the good removal of heat, which, relative to the surface of the cooking zone, can be considerably over the heating elements used so far in glass ceramic cooking areas. As a result, the performance efficiency of the cooking system is significantly increased.

In using inferior pot qualities or in improper placement of of the cookware, the output distribution is changed so that the temperature/time stress of the glass ceramic is reduced under the pot bottom. In the areas of the cooking zone, in which the pot is placed, and a good removal of heat occurs, an increased output density is maintained relative to the usual heating systems, while in areas with inferior heat contact, the output is reduced accordingly. Thus, altogether, the boiling time is reduced in cooking processes with inferior cookware because of the higher average output offered.

The entire disclosures of all applications, patents and publications, cited above and below, and of corresponding application Federal Republic of Germany P 40 22 846.0-34, filed Jul. 18, 1991, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In an arrangement for controlling the temperature of a glass ceramic heating plate useful for heating the contents of a cooking pot regardless of the quality of the pot, the improvement comprising:

at least on heating zone with a heating device with at least two separately controllable individual heating elements in proximity with the glass ceramic heating plate, the heating elements defining a course of maximum temperature occurrence in the heating zone when the heating zone is energized without a pot thereon and when a pot of inferior quality is used, the heating elements being arranged concentric to one another to delimit associated circular areas in the heating zone of the heating plate which are concentric to one another;

power supply means for the heating elements;

a plurality of temperature sensors arrayed in circular arrays in each of the circular areas of the heating zone of the glass ceramic heating plate, the temperature sensors being strip-like, glass ceramic, temperature-measuring resistances which are bonded in the heating zone of the heating plate between parallel strip conductors, the strip conductors being run in proximity with the entire course of maximum temperature occurrence so that the strip-like glass ceramic temperature-measuring resistances indicate the course of maximum temperature in the heating zone in potless operation and when a pot of inferior quality is used.

2. The arrangement according to claim 1, wherein the heating devices are multicircuit heating elements.

3. The arrangement according to claim 1, wherein the heating devices are dual-circuit heating elements.

4. The arrangement according to claim 1, wherein the individual heating circuits are each designed for varying surface stresses.

5. The arrangement according to claim 1, wherein the glass ceramic heating plate is a glass ceramic cooking surface.

6. The improvement according to claim 1 further including means connected to the temperature sensors for monitoring the temperature sensors individually and means for connecting the monitoring means between the individual heating elements and a power supply for energizing the individual heating elements according to signals from the temperature sensors.

7. In an arrangement for controlling the temperature of a glass ceramic heating plate useful for heating the contents of a cooking pot regardless of the quality of the pot, the improvement comprising:

at least one heating zone with an oval multi-element heating device which delimits the heating zone in a circular central area and at least one sickle-shaped edge area adjacent to the central area, the heating device having separately controllable individual heating elements in proximity with the glass ceramic heating plate, the heating elements defining a course of maximum temperature occurrence in the heating zone when the heating zone is energized without a pot thereon and when a pot of inferior quality is used;

power supply means for the heating elements;

at least one circular array of glass ceramic temperature sensors placed in the central area and at least one sickle-shaped array of glass ceramic temperature sensors placed in the at least one edge area, the temperature sensors being strip-like, glass ceramic, temperature-measuring resistances which are bonded in the heating zone of the heating plate between parallel strip conductors, the strip conductors being run in proximity with the entire course of maximum temperature occurrence so that the strip-like, glass ceramic, temperature-measuring resistances indicate the course of maximum temperature in the heating zone in potless operation and when a pot of inferior quality is used.

8. The improvement according to claim 7 further including means connected to the temperature sensors for monitoring the temperature sensors individually and means for connecting the monitoring means between the individual heating elements and a power supply for energizing the individual heating elements according to signals from the temperature sensors.

9. The arrangement according to claim 7, wherein the heating devices are multi-circuit heating elements.

10. The arrangement according to claim 7, wherein the heating devices are dual-circuit heating elements.

11. The arrangement according to claim 7, wherein the individual heating circuits are each designed for varying surfaces stresses.

12. The arrangement according to claim 7, wherein the glass ceramic heating plate is a glass ceramic cooking surface.

13. In an arrangement for controlling the temperature of a glass ceramic heating plate useful for heating the contents of a cooking pot regardless of the quality of the pot, the improvement comprising:

at least one heating zone with a square multi-element heating device which delimits the heating zone in a circular central area and at least one rectangular edge area adjacent to the central area, the heating device having separately controllable individual heating elements in proximity with the glass ceramic heating plate, the heating elements defining a course of maximum temperature occurrence in the heating zone when the heating zone is energized without a pot thereon and when a pot of inferior quality is used;

power supply means for the heating elements;

at least one circular array of glass ceramic temperature sensors placed in the central area and at least one sickle-shaped array of glass ceramic temperature sensors placed in the at least one edge area, the temperature sensors being striplike, glass ceramic, temperature-measuring resistances which are bonded in the heating zone of the heating plate between parallel strip conductors, the strip conductors being run in proximity with the entire course of maximum temperature occurrence so that the strip-like, glass ceramic, temperature-measuring resistances indicate the course of maximum temperature in the heating zone in potless operation and when a pot of inferior quality is used.

14. The improvement of claim 13 further including means connected to the temperature sensors for monitoring the temperature sensors individually and means for connecting the monitoring means between the individual heating elements and a power supply for energizing the individual heating elements according to signals from the temperature sensors.

15. The arrangement according to claim 13, wherein the heating devices are multi-circuit heating elements.

16. The arrangement according to claim 13, wherein the heating devices are dual-circuit heating elements.

17. The arrangement according to claim 13, wherein the individual heating circuits are each designed for varying surface stresses.

18. The arrangement according to claim 13, wherein the glass ceramic heating plate is a glass ceramic cooking surface.

* * * * *